(12) United States Patent
Cho et al.

(10) Patent No.: US 11,592,611 B2
(45) Date of Patent: Feb. 28, 2023

(54) TRAY MODULE, TRAY ASSEMBLY HAVING THE TRAY MODULE, AND METHOD OF FABRICATING DISPLAY DEVICE USING THE TRAY ASSEMBLY

(71) Applicant: Samsung Display Co., LTD., Yongin-si (KR)

(72) Inventors: Jin-wook Cho, Gyeongsan-si (KR); Ja Huem Koo, Seoul (KR); Bo bae Sim, Cheonan-si (KR); Sung jin Joo, Asan-si (KR); Wonjun Choi, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 262 days.

(21) Appl. No.: 16/819,395

(22) Filed: Mar. 16, 2020

(65) Prior Publication Data
US 2020/0301063 A1    Sep. 24, 2020

(30) Foreign Application Priority Data
Mar. 18, 2019  (KR) .......................... 10-2019-0030753

(51) Int. Cl.
*A47G 19/00* (2006.01)
*B65G 47/52* (2006.01)
*F21V 8/00* (2006.01)

(52) U.S. Cl.
CPC ........... *G02B 6/0093* (2013.01); *A47G 19/00* (2013.01); *B65G 47/52* (2013.01); *G02B 6/005* (2013.01); *G02B 6/0065* (2013.01); *G02B 6/0076* (2013.01); *G02B 6/0088* (2013.01)

(58) Field of Classification Search
CPC ........ B65D 25/04; B65D 85/30; B65D 85/38; G02B 6/0076; G02B 6/0081; G02B 6/0093
See application file for complete search history.

(56) References Cited

U.S. PATENT DOCUMENTS

| | | | | |
|---|---|---|---|---|
| 4,584,225 A | * | 4/1986 | Adelman | ................ B32B 27/10 296/191 |
| 6,474,475 B1 | * | 11/2002 | Bjork | ................ H01L 21/67333 206/499 |
| 2006/0124574 A1 | * | 6/2006 | Yousif | .................... B65D 77/24 220/359.3 |
| 2018/0305096 A1 | | 10/2018 | Hagihara et al. | |

FOREIGN PATENT DOCUMENTS

| KR | 101011257 B1 | 1/2011 |
|---|---|---|
| KR | 1020120089233 A | 8/2012 |
| KR | 1020180006208 A | 1/2018 |
| KR | 1020180054750 A | 5/2018 |

* cited by examiner

*Primary Examiner* — Andrew T Kirsch
(74) *Attorney, Agent, or Firm* — Cantor Colburn LLP

(57) ABSTRACT

A tray module includes a tray in which a plurality of display device components are alternately stackable with a plurality of protective sheets. Each of a protective sheet among the plurality of protective sheets includes: a first polymer layer including a first polymer resin which is foamed, and top and bottom surfaces opposite to each other; a second polymer layer on each of the top and bottom surfaces of the first polymer layer, the second polymer layer including a second polymer resin; and a paper layer defining an outer surface of the protective sheet.

17 Claims, 14 Drawing Sheets

TRAY MODULE, TRAY ASSEMBLY HAVING THE TRAY MODULE, AND METHOD OF FABRICATING DISPLAY DEVICE USING THE TRAY ASSEMBLY

This application claims priority to Korean Patent Application No. 10-2019-0030753 filed on Mar. 18, 2019, and all the benefits accruing therefrom under 35 U.S.C. § 119, the entire contents of which are hereby incorporated by reference.

BACKGROUND

1) Field

The invention relates to a tray module, a tray assembly including the tray module, and a method of fabricating a display device using the tray assembly. More particularly, the invention relates to a tray module including a protective sheet between display device components and with which the display device components are transported, a tray assembly including the tray module, and a method of fabricating a display device using the tray assembly.

2) Description of the Related Art

A display device includes a number of components such as a display panel, a protective member, an optical member, and the like. The display device may further include a touch screen, depending on usage thereof. A transmissive or transflective display device may further include a backlight unit. Such display device components are collectively integrated through a lamination process, an assembly process, and the like to provide the display device.

SUMMARY

One or more embodiment of the invention provides a tray module which reduces or effectively prevents display device components from being stained during transportation thereof between physical locations.

One or more embodiment of the invention provides a tray assembly which reduces or effectively prevents display device components from being stained during transportation thereof between physical locations.

One or more embodiment of the invention provides a method of fabricating a display device using the tray assembly.

According to an embodiment of the invention, a tray module includes: a tray in which a plurality of display device components are alternately stackable with a plurality of protective sheets. Each of a protective sheet among the plurality of protective sheets includes: a first polymer layer including a first polymer resin which is foamed, and top and bottom surfaces opposite to each other; a second polymer layer on each of the top and bottom surfaces of the first polymer layer, the second polymer layer including a second polymer resin; and a paper layer disposed on at least one of the second polymer layer on each of the top and bottom surfaces of the first polymer layer.

In an embodiment, the paper layer may include a cellulose pulp.

In an embodiment, the paper layer may further include an antistatic agent.

In an embodiment, a thickness of the paper layer may be in a range from about 50 micrometers (µm) to about 100 µm.

In an embodiment, the display device components may include a light guide plate or a display panel.

In an embodiment, each one of the display device components may include a light guide plate including a glass light guide layer and a quantum-dot layer which is on the glass light guide layer. The plurality of protective sheets may include a first protective sheet and a second protective sheet. The plurality of display device components alternately stacked with the plurality of protective sheets within the tray may dispose: the first protective sheet and the second protective sheet on opposing surfaces of the light guide plate, the glass light guide layer in contact with the paper layer of the first protective sheet and the quantum-dot layer in contact with the second polymer layer of the second protective sheet.

In an embodiment, the protective sheet may further include an adhesive layer disposed directly between the second polymer layer and the paper layer.

In an embodiment, the tray may include: a bottom portion on which the plurality of display device components and the plurality of protective sheets are supportable; and a sidewall portion extending from the bottom portion.

In an embodiment, the first polymer layer may further include a foaming agent.

In an embodiment, the second polymer layer may further include an antistatic agent.

In an embodiment, the second polymer layer may be disposed directly on the first polymer layer.

In an embodiment, the first polymer resin may be low-density polyethylene. The second polymer resin may be high-density polyethylene.

In an embodiment, a thickness of the first polymer layer may be in a range from about 800 µm to about 1200 µm. A thickness of the second polymer layer may be in a range from about 25 µm to about 35 µm.

According to an embodiment of the invention, a tray assembly includes: a plurality of tray modules which are stackable on each other; and a support plate on which the plurality of tray modules are supportable. Each of the tray modules includes a tray in which a plurality of display device components are alternately stackable with a plurality of protective sheets, each of a protective sheet among the plurality of protective sheets includes: a first polymer layer including a first polymer resin which is foamed, and top and bottom surfaces opposite to each other, a second polymer layer on each of the top and bottom surfaces of the first polymer layer, the second polymer layer including a second polymer resin; and a paper layer disposed on at least one of the second polymer layer on each of the top and bottom surfaces of the first polymer layer, and the plurality of display device components alternately stacked with the plurality of protective sheets within the tray respectively disposes the glass of the plurality of display device components in contact with the paper layer of a respective protective sheet among the plurality of protective sheets.

In an embodiment, each of the plurality of display device components includes glass, and the plurality of display device components alternately stacked with the plurality of protective sheets within the tray respectively disposes the glass of the plurality of display device components in contact with the paper layer of a respective protective sheet among the plurality of protective sheets.

In an embodiment, the plurality of display device components may include a light guide plate including a glass light guide layer or a display panel including a glass substrate.

In an embodiment, the light guide plate may further include a quantum-dot layer on the glass light guide layer.

In an embodiment, the first polymer layer may further include a foaming agent. The second polymer layer may further include an antistatic agent.

According to an exemplary embodiment of the invention, a method of fabricating a display device includes: providing a plurality of display device components; and assembling the plurality of display device components to provide the display device. The providing the plurality of display device components includes using a tray assembly to transfer the plurality of display device components between physical locations, and the tray assembly includes: a plurality of tray modules which are stackable on each other, and a support plate on which the plurality of tray modules are supportable, the plurality of tray modules which are supported on the support plate being movable together with the support plate between the physical locations. Each of a tray module among the plurality of tray modules including a plurality of protective sheets alternately stacked with the plurality of display device components. Each of a protective sheet among the plurality of protective sheets includes: a first polymer layer including a first polymer resin which is foamed, and top and bottom surfaces opposite to each other; a second polymer layer on each of the top and bottom surfaces of the first polymer layer, the second polymer layer including a second polymer resin; and a paper layer disposed on at least one of the second polymer layer on each of the top and bottom surfaces of the first polymer layer.

In an embodiment, the tray module may include a tray in which the plurality of display device components are alternately stackable with the plurality of protective sheets, each of a display device component among the plurality of display device components may include glass, the plurality of protective sheets may include a first protective sheet and a second protective sheet. The using the tray assembly to transfer the plurality of display device components between the physical locations may include: providing the first protective sheet on the tray; providing the display device component on the first protective sheet; and providing the second protective sheet on the display device component to dispose the first and second protective sheets on opposing surfaces of the display device component. The first and second protective sheets on opposing surfaces of the display device component disposes the glass of the display device component contacting the paper layer of the first protective sheet.

In an embodiment, the tray module may include a tray in which the plurality of display device components are alternately stackable with the plurality of protective sheets, the protective sheet may include a first protective sheet and a second protective sheet. The plurality of display device components may each include a light guide plate having a glass light guide layer and a quantum-dot layer on the glass light guide layer. The using the tray assembly to transfer the plurality of display device components between physical locations may include: providing the first protective sheet on the tray; providing the light guide plate on the first protective sheet; and providing the second protective sheet on the light guide plate, to dispose the first and second protective sheets on opposing surfaces of the light guide plate. The first and second protective sheets on opposing surfaces of the light guide plate may dispose the glass light guide layer contacting the paper layer of the first protective sheet, and may dispose the quantum-dot layer contacting the second polymer layer of the second protective sheet.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Figure 1:
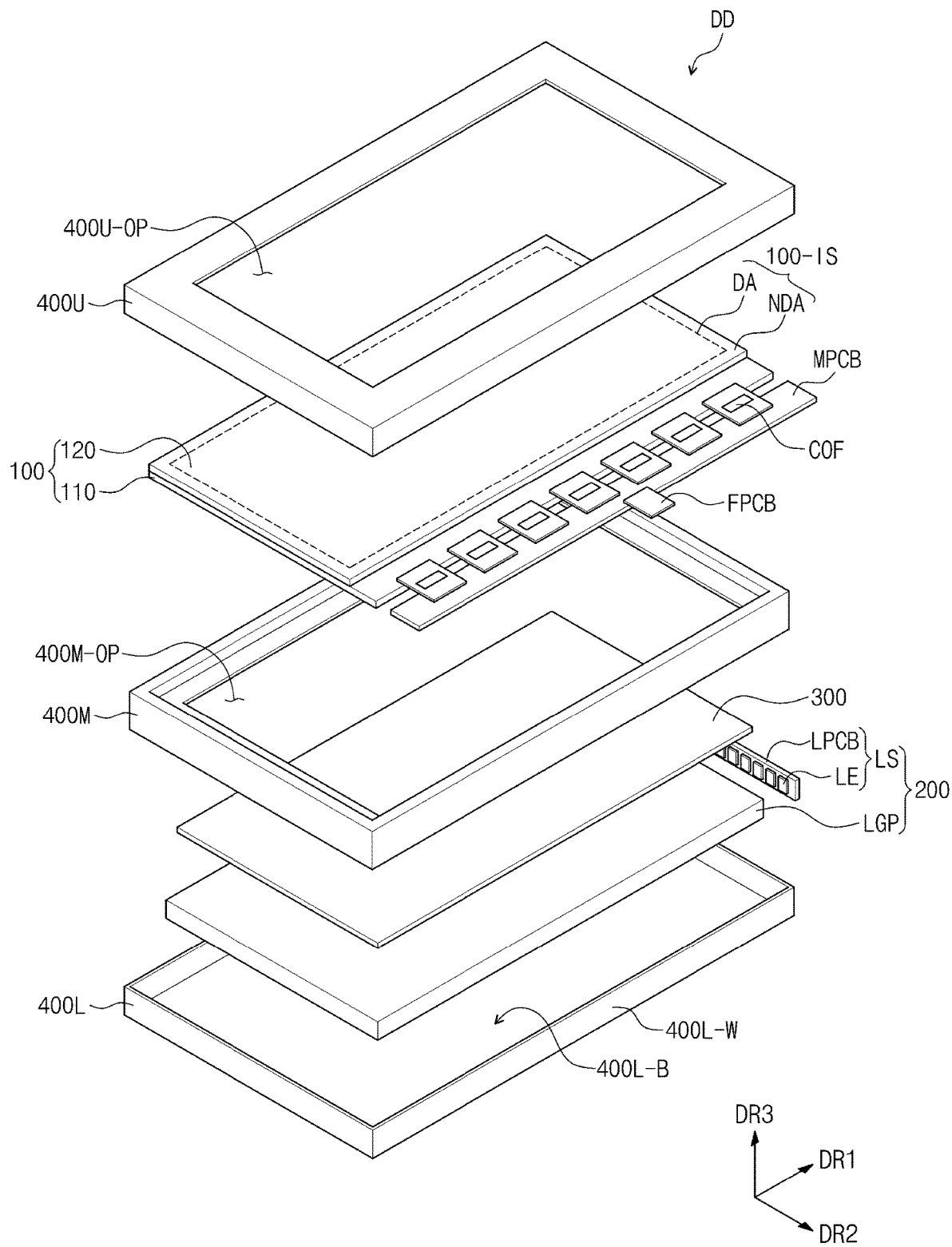
FIG. 1 illustrates an exploded perspective view of an embodiment of a display device.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In this description, when a certain component (or region, layer, portion, etc.) is referred to as being related to another element such as being "on," "connected to" or "coupled to" other component(s), the certain component may be directly disposed on, directly connected to, or directly coupled to the other component(s) with no intervening component present therebetween or at least one intervening component may be present therebetween. In contrast, when a certain component (or region, layer, portion, etc.) is referred to as being related to another element such as being "directly on," "directly connected to" or "directly coupled to" other component(s), there are no intervening component present therebetween.

In addition, the terms "below," "beneath," "lower," "above," "upper" and the like are used herein to describe one component's relationship to other component(s) illustrated in the drawings. The relative terms are intended to encompass different orientations in addition to the orientation depicted in the drawings. For example, when it is noted that some element is disposed "on" another element, it means that some element is disposed above or below another element.

In this description, the phrase "a component B is directly disposed on a component A" means that neither an adhesive layer nor an adhesive member is disposed between the component A and the component B. For example, the phrase "is directly disposed" means "is in direct contact with." As used herein, "contact" may indicate a physical and/or mechanical contact between elements.

Like numerals indicate like components. Moreover, in the drawings, thicknesses, ratios, and dimensions of components are exaggerated for effectively explaining the technical contents.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." The term "and/or" includes one or more combinations defined by associated components.

It will be understood that, although the terms first, second, etc. may be used herein to describe various components, these components should not be limited by these terms. These terms are only used to distinguish one component from another component. For example, a first component could be termed a second component, and vice versa without departing from the scope of the invention. Unless the context clearly indicates otherwise, the singular forms are intended to include the plural forms as well.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms used herein including technical and scientific terms have the same meaning generally understood by one of ordinary skilled in the art. Also, terms as defined in dictionaries generally used should be understood as having meaning identical or meaning contextually defined in the art and should not be understood as ideally or excessively formal meaning unless definitely defined herein.

It should be understood that the terms "comprise," "include," "have" and the like are used to specify the presence of stated features, integers, steps, operations, components, elements, or combinations thereof, but do not preclude the presence or addition of one or more other features, integers, steps, operations, components, elements, or combinations thereof.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A display panel, a protective member, an optical member, a touch screen, and a backlight unit of a display device may be manufactured at different locations or by different fabrication process lines and then assembled in an assembly process to provide the display device. One or more display device component among the display panel, the protective member, the optical member, the touch screen, and the backlight unit may be provided from one or more external vendors. When the display device components are transferred to the assembly line from the fabrication process lines or the external vendors, a tray assembly may be used to safely transport the display device components.

The following will now describe embodiments of the invention in conjunction with the accompanying drawings.

Figure 2:
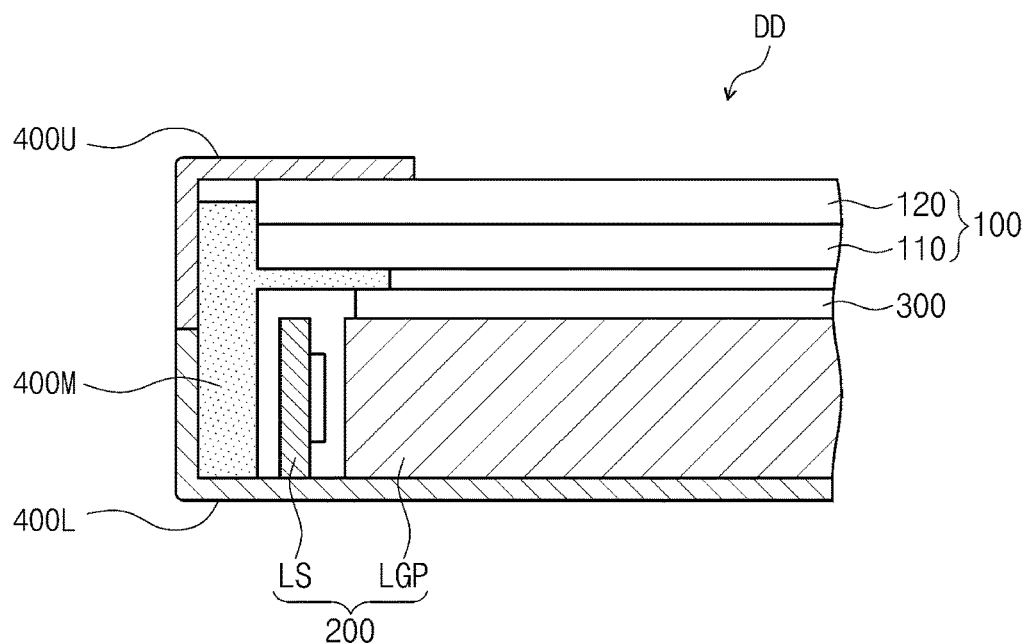
FIGS. 2 and 3 illustrate cross-sectional views of embodiments of end portions of a display device.
Figure 3:
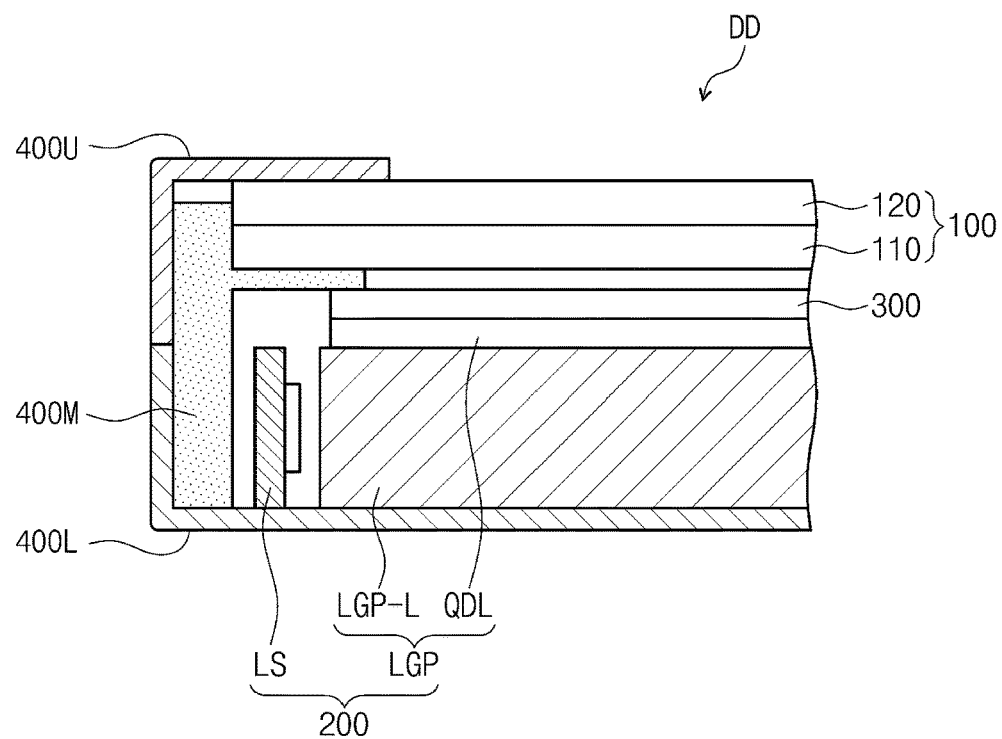
Figure 4:
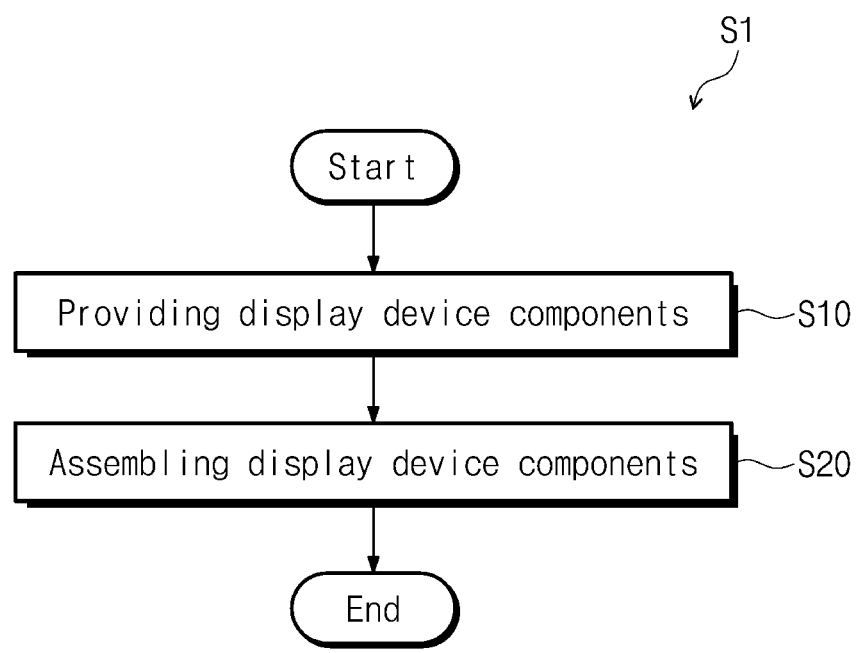
FIG. 4 illustrates a flow chart of an embodiment of a method of fabricating a display device.

FIG. 1 illustrates an exploded perspective view of an embodiment of a display device DD. FIGS. 2 and 3 illustrate cross-sectional views of embodiments of end portions of the display device DD. FIG. 4 illustrates a flow chart of an embodiment of a method S1 of fabricating the display device DD.

As shown in FIGS. 1, 2 and 3, the display device DD includes a display panel 100, a backlight unit 200, an optical member 300, and a protective member 400L, 400U, and 400M.

The display panel 100 receives light generated in and/or provided from the backlight unit 200, and displays an image with the received light. The display panel 100 may include a transmissive or transflective display panel, such as a liquid crystal display panel, an electrophoresis display panel, an organic light emitting display panel, and an electro-wetting display panel, but the invention is not limited thereto.

The display panel 100 may display an image at or on a display surface 100-IS. The display surface 100-IS is parallel to a plane defined by a first directional axis DR1 and a second directional axis DR2 crossing each other. A third directional axis DR3 indicates a normal direction to the display surface 100-IS, or a thickness direction of the display device DD, the display panel 100 and/or components thereof.

The third directional axis DR3 differentiates a front surface (or top surface) and a rear surface (or bottom surface) of each member or unit within the display device DD, which will be discussed below. However, the first, second, and third directional axes DR1, DR2, and DR3 are merely illustratively shown in embodiments of the invention. First, second, and third directions are defined hereinafter to refer to directions indicated by the first, second, and third directional axes DR1, DR2, and DR3, respectively, and are allocated the same reference numerals thereto.

In an embodiment, although the display panel 100 is exemplarily illustrated to have a display surface 100-IS which is flat, the display panel 100 may be a curved display panel having a display surface 100-IS which is curved. The shape of the display panel 100 is not particularly limited.

The following will describe the display panel 100 as a liquid crystal display panel. The liquid crystal display panel includes a first substrate 110, a second substrate 120 facing the first substrate 110, and an optical control layer such as a liquid crystal layer (not shown) provided or formed between the first substrate 110 and the second substrate 120. The liquid crystal display panel may be divided into a display area DA and an edge area NDA (e.g., non-display area NDA) which is adjacent to the display area DA. In a top plan view (e.g., along the thickness direction), the display area DA is a region at which an image is displayed, and the edge area NDA is a region to which the display area DA is adjacent and at which no image is displayed. The liquid crystal display panel includes a plurality of pixels disposed in the display area DA. At the pixels, an image may be generated and/or displayed, light may be generated and/or emitted etc. The liquid crystal display panel may further include a pair of polarizers (not shown). The display device DD and/or components thereof may include a display area DA and an edge area NDA corresponding to those described above, without being limited thereto.

A signal line and a pixel circuit which are connected to the pixels are provided or formed on an array substrate as one of the first and second substrates 110 and 120. The array substrate of the display panel 100 may be connected to a main circuit board MPCB through a first flexible circuit board COF. A driver chip may be mounted on the first flexible circuit board COF. The driver chip may be a data driver chip. The main circuit board MPCB is provided thereon with a central control circuit that drives the display panel 100. The central control circuit may be a microprocessor. A gate driver circuit may be mounted on the array substrate or may be integrated in the shape of low-temperature polysilicon (LTPS) TFT on the array substrate.

The main circuit board MPCB may be connected through a second flexible circuit board FPCB to an external electronic part. The main circuit board MPCB and/or the external electronic part which is disposed outside of the display panel 100, may generate and/or provide one or more of an electronic signal for driving the display panel 100. The electronic signal may be transmitted from the main circuit board MPCB to the display panel 100, through the first flexible circuit board COF. The electronic signal provided to the display panel 100 may be transmitted to the pixels through the signal line and pixel circuit.

A control circuit may control the backlight unit 200. The backlight unit 200 may receive an electronic signal such as a dimming signal that controls the backlight unit 200.

The backlight unit 200 is disposed below the display panel 100 and the optical member 300. The backlight unit 200 may include a light source LS and a light guide plate LGP. The light source LS includes a light-emitting element LE provided in plural (e.g., a plurality of light-emitting elements LE) and a circuit board LPCB which is connected to the light-emitting elements LE and provides the light-emitting elements LE with electrical signals for generating and/or emitting light. Each of the light-emitting elements LE may include a light-emitting diode without being limited thereto. In an embodiment, FIGS. 2 and 3 have the light source LS indicated at the circuit board LPCB having a light-emitting element LE disposed at a right side of the circuit board LPCB.

The light guide plate LGP guides light received from the light source LS, toward the display panel 100. The light guide plate LGP may include a light guide layer LGP-L and a quantum-dot layer QDL which is disposed on the light guide layer LGP-L. The light guide plate LGP indicated in FIG. 2 may also be considered as a light guide layer LGP-L as shown in FIG. 3. The light guide layer LGP-L may include a glass light guide layer. Alternatively, the light guide layer LGP-L may include a synthetic-resin light guide layer. The synthetic resin may be polymethylmethacrylate.

Referring to FIG. 3, the light source LS may generate and emit a blue light, and the quantum-dot layer QDL may receive the blue light to generate and/or provide a yellow light and a red light. In an embodiment, the quantum-dot layer QDL may be provided formed directly on a top surface (e.g., light emitting surface) of the light guide layer LGP-L which faces the quantum-dot layer QDL. In an embodiment of manufacturing the display device DD, the quantum-dot layer QDL may be a quantum-dot material layer which is printed or coated on the top surface of the light guide layer LGP-L.

The optical member 300 is disposed below the display panel 100 and on the backlight unit 200. The optical member 300 may include a prism sheet. The optical member 300 may further include a functional sheet for improvement of optical characteristics.

The protective member 400L, 400U, and 400M may include a first protective member 400L disposed below the backlight unit 200 and a second protective member 400U disposed on the display panel 100. The protective member 400L, 400U, and 400M may further include a third protective member 400M disposed between the first protective member 400L and the second protective member 400U. The first protective member 400L, the second protective member 400U, and the third protective member 400M are connected to each other to accommodate therein the display panel 100, the backlight unit 200, and the optical member 300. The first protective member 400L and the second protective member 400U may include of metal or plastic.

The first protective member 400L receives the backlight unit 200. The first protective member 400L includes a bottom segment 400L-B (e.g., bottom portion 400L-B) and a sidewall segment 400L-W (e.g., a sidewall portion 400L-W) provided in plural (e.g., a plurality of sidewall segments 400L-W or a plurality of sidewall portions 400L-W) angularly extending from one or more edges of the bottom segment 400L-B. The shape of the first protective member 400L is not particularly limited. The number of the sidewall segments 400L-W may be changed. A structure or profile of the first protective member 400L may include height differences defined by stepped portions of the bottom segment 400L-B and/or the sidewall segments 400L-W.

The second protective member 400U is disposed on the display panel 100 and covers an edge region of the display panel 100. The second protective member 400U defines an opening 400U-OP through which an image passes or is viewable from the display panel 100 to outside the display device DD. The opening 400U-OP corresponds to the display area DA of the display panel 100.

The third protective member 400M may support the display panel 100 in a receiving space between the first protective member 400L and the second protective member 400U. Referring to FIG. 1, for example, the third protective member 400M may be a rectangular frame in a top plan view. The third protective member 400M may be divided into four segments. The segments of the third protective member 400M may correspond to respective sidewall segments 400L-W of the first protective member 400L. The four segments of the third protective member 400M may form a single unitary shape or may include separately-provided segments which are assembled into a single body. The four segments define the opening 400M-OP.

Referring to FIG. 4, a display device fabrication method S1 includes processes of providing display device components (S10) and assembling the display device components (S20). The display device components may include the display panel 100, the backlight unit 200, the optical member 300, and the protective member 400L, 400U, and 400M shown in FIGS. 1 and 2. When the display device DD is a light-emitting type display device, the backlight unit 200 may be omitted.

The providing the display device components (S10) includes transferring the display panel 100, the backlight unit 200, the optical member 300, and the protective member 400L, 400U, and 400M, such as from a first physical location to a second physical location which is different from the first physical location. The providing the display device components (S10) further includes manufacturing each of the display panel 100, the backlight unit 200, the optical member 300, and the protective member 400L, 400U, and 400M. The display device components may be manufactured or provided separately from each other. Any of a number of methods or processes may be performed to respectively manufacture or provide each of the display panel 100, the backlight unit 200, the optical member 300, and the protective member 400L, 400U, and 400M.

In an embodiment, the display panel 100, the backlight unit 200, the optical member 300, and the protective member 400L, 400U, and 400M may be manufactured or provided in fabrication process lines different from each other, and then transferred to an assembly line at which various display device components are assembled with each other. The fabrication process lines and the assembly line may not be installed on a same physical space or location. One or more among the display device components such as the display panel 100, the backlight unit 200, the optical member 300, and the protective member 400L, 400U, and 400M may be manufactured or provided outside or external to the assembly line (e.g., an external fabrication process line), and then subsequently transferred to the assembly line.

When more among the display device components such as the display panel 100, the backlight unit 200, the optical member 300, and the protective member 400L, 400U, and 400M are transferred to the assembly line from either an internal fabrication process line (e.g., in a same physical space or location as the assembly line) or an external fabrication process line, a tray module (see TM of FIG. 5A) and a tray assembly (see TA of FIG. 8) are used to safely transport the display device components between physical spaces or locations.

Figure 5A:
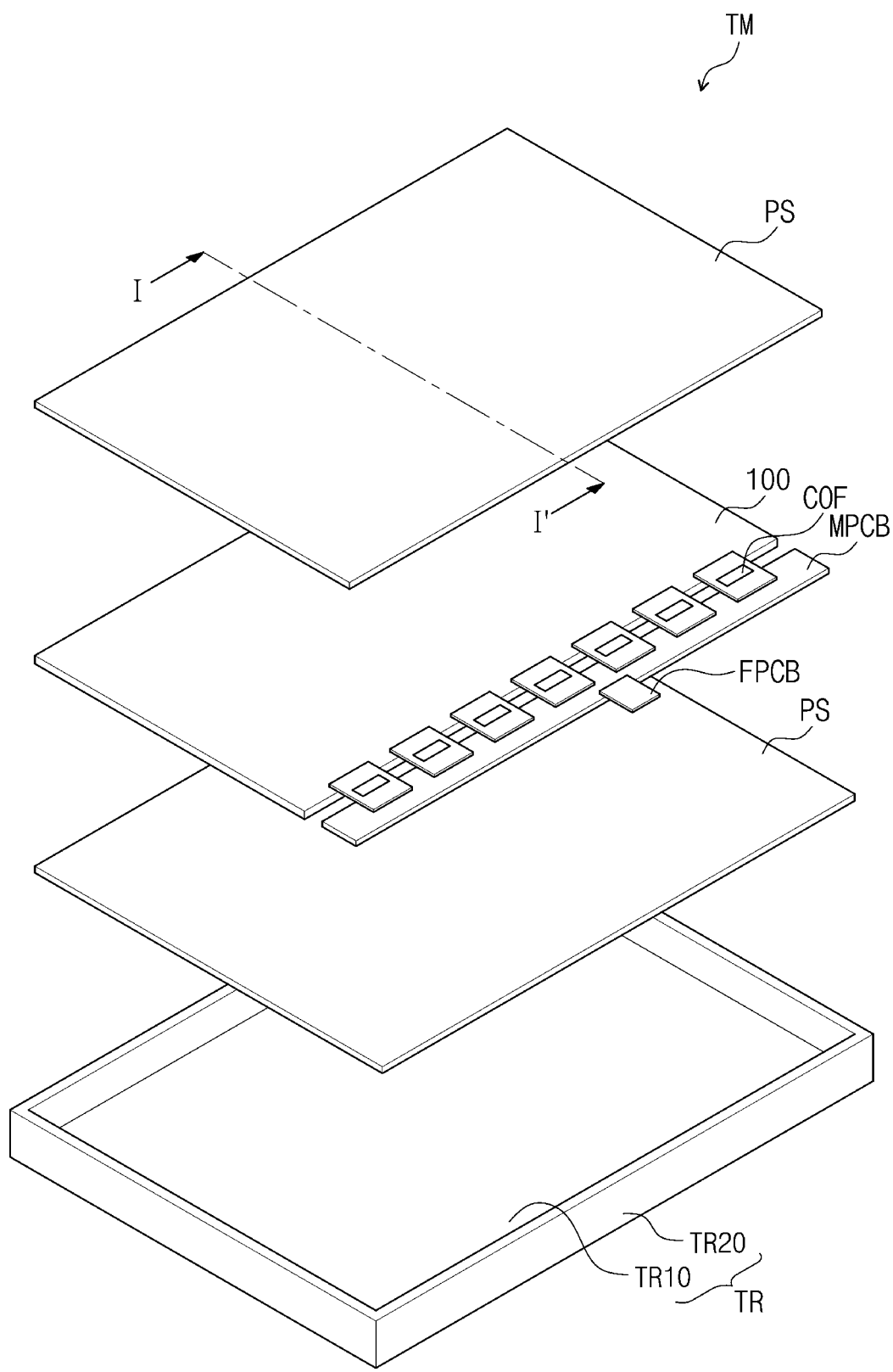
FIGS. 5A and 5B illustrate exploded perspective views of embodiments of a tray module.
Figure 5B:
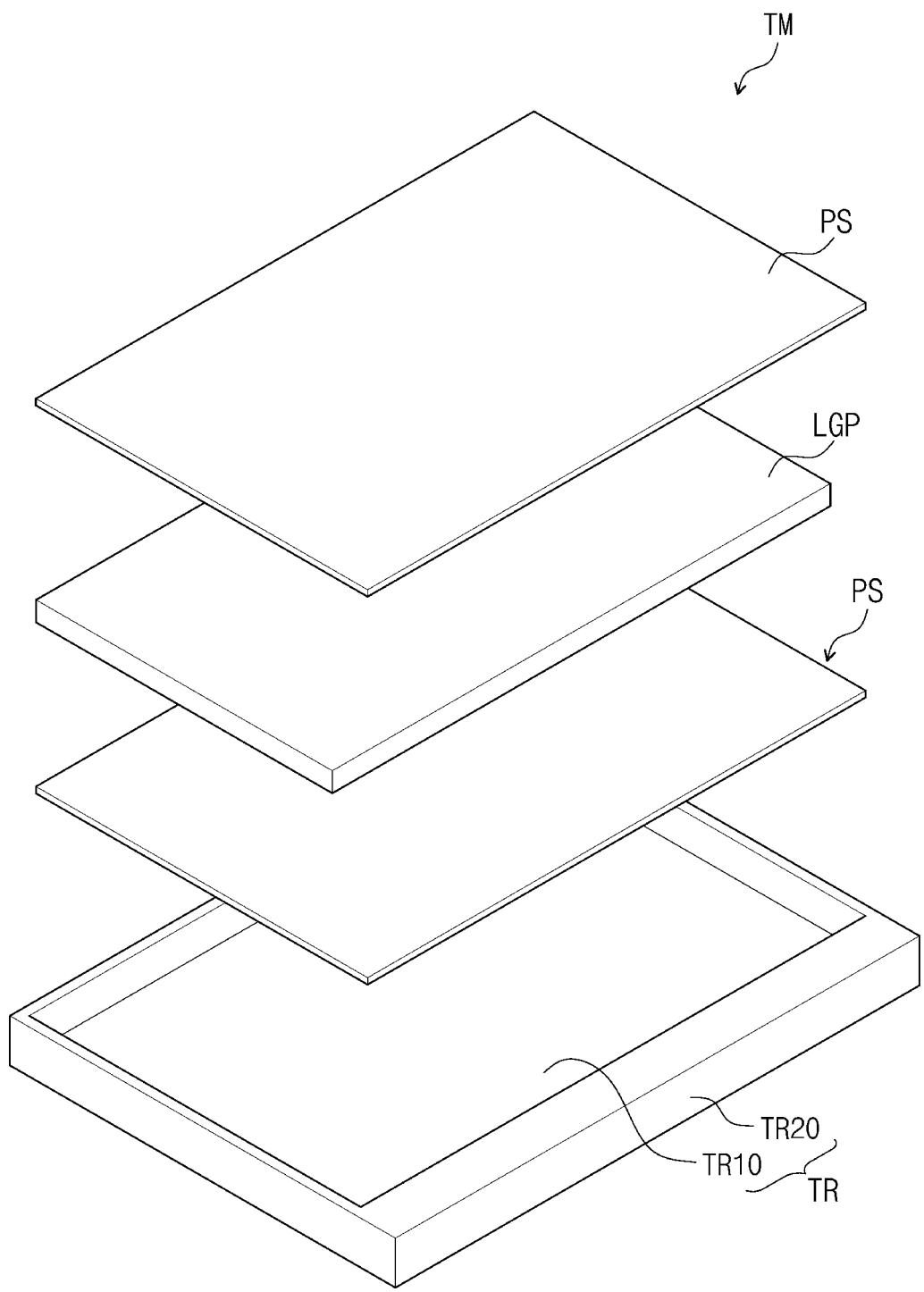
Figure 6A:
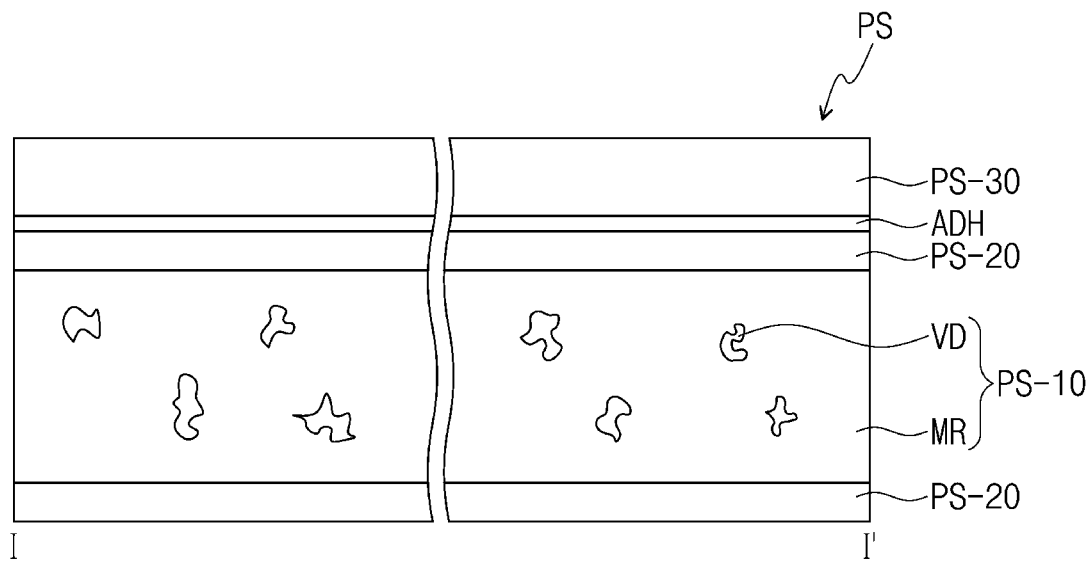
FIGS. 6A and 6B illustrate cross-sectional views of embodiments of a protective sheet.
Figure 6B:
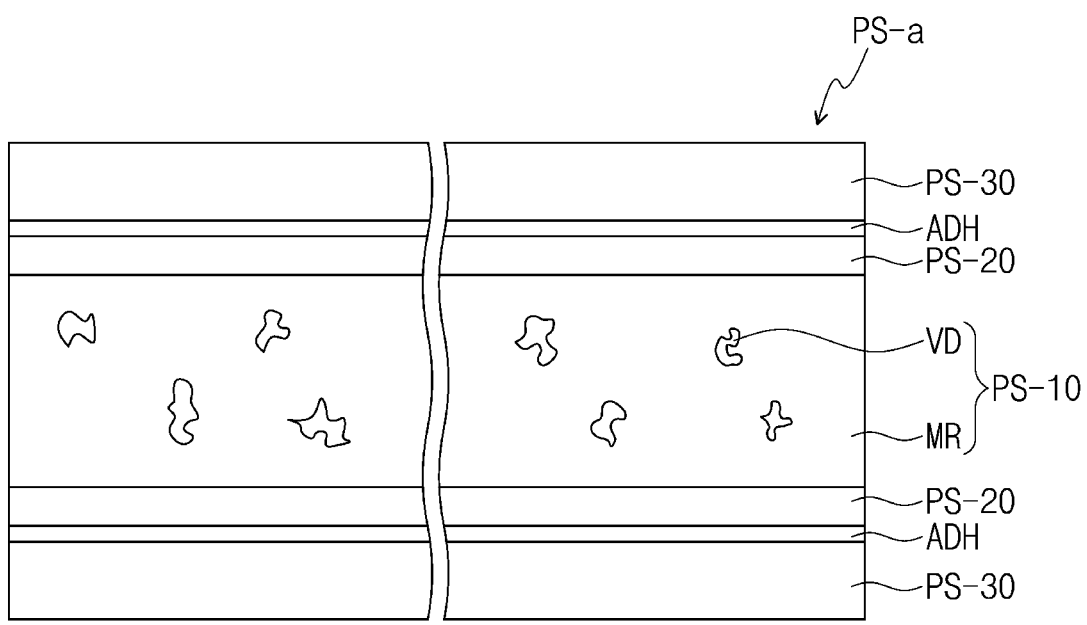

FIGS. 5A and 5B illustrate exploded perspective views of embodiments of a tray module TM relative to various display device components. FIGS. 6A and 6B illustrate enlarged cross-sectional views of embodiments of protective sheets PS and PS-a of the tray module TM. FIGS. 6A and 6B illustrate enlarged cross-sectional views taken along line I-I' of FIG. 5A.

As shown in FIGS. 5A and 5B, the tray module TM includes a tray TR and a protective sheet PS. The tray TR accommodates a plurality of display device components. FIG. 5A exemplarily illustrates the display panel 100 as a first member among the plurality of display device components, and FIG. 5B exemplarily illustrates the light guide plate LGP as a second member among the plurality of display device components. The display panel 100 and the light guide plate LGP may include glass substrates. In an embodiment, each of the first and second substrates 110 and 120 of the display panel 100 may include a glass substrate. In an embodiment, for example, the first substrate 110 may include a base substrate composed of glass, and the second substrate 120 may include a window composed of glass. In another embodiment, for example, the light guide layer LGP-L of the light guide plate LGP may be a glass substrate.

The tray module TM includes the protective sheet PS having a paper layer PS-30 discussed below with reference to FIG. 6A. The protective sheet PS having the paper layer PS-30 may reduce or effectively prevent transfer of a polymeric constituent from the protective sheet PS to the display device components. Accordingly, the tray module TM is suitable for transporting any of a number of the display device components such as the display panel 100 and the light guide plate LGP.

The tray TR may include a bottom segment TR10 (e.g., bottom portion TR10) overlapping and supporting the display device components and a sidewall segment TR20 (e.g., sidewall portion TR20) extending from the bottom segment TR10. Although a structure of the bottom segment TR10 and the sidewall segment TR20 are illustrated with simplicity, stepped portions, height differences and grooves may be defined on the bottom segment TR10 and/or the sidewall segment TR20. The shape of the tray TR is not limited to that shown in FIGS. 5A and 5B.

A material of the tray TR may include a synthetic resin. The tray TR may include or be provided of an expandable polystyrene resin. The material of the tray TR is not particularly limited. The tray TR may be provided or manufactured by various plastic molding methods depending on the material for forming the tray TR.

Within the tray module TM, the protective sheet PS may be alternately stacked with the display device components such that the tray module TM includes a plurality of protective sheets PS. The protective sheet PS may reduce or effectively prevent friction between the display device components and another element such as a component of the tray module TM or absorb impact to a display device component occurring during transportation, suppressing damage to the display device DD and the components thereof. In addition, the protective sheet PS may discharge static electricity charged in the display device components, away from the display device components. The protective sheet PS will be further discussed in detail below.

Referring to FIG. 6A or 6B, the protective sheet PS or a modified embodiment of the protective sheet PS-a may include a first polymer layer PS-10, a second polymer layer PS-20, and a paper layer PS-30.

The first polymer layer PS-10 may include a first polymer resin. The first polymer resin may include an expandable resin. In an embodiment, for example, the first polymer layer PS-10 may include a matrix MR or base material provided or formed including the first polymer resin, and a void VD which is defined within the first polymer layer PS-10 by the matrix MR. The void VD may be an empty space defined by portions of the matrix MR, such as where material of the matrix MR is absent, without being limited thereto. The first polymer layer PS-10 may be foamed low-density polyethylene ("LDPE") (e.g., low-density polyethylene foam), but the invention is not limited thereto. The first polymer layer PS-10 may include at least one among a variety of expandable resins suitable for the purpose described herein.

The first polymer layer PS-10 may further include a foaming agent. The foaming agent may include, but not limited particularly to, an inorganic or organic foaming agent. In an embodiment, for example, the organic foaming agent may include a hydrazide-based foaming agent or a non-hydrazide-based foaming agent. The organic foaming agent may be one or more selected from ADCA (azodicarbonamide), reformed ACDA, OBSH (p,p'-oxybis-(benzenesulfonyl hydrazide)), DPT (dinitroso pentamethylene tetramine), TSH (p-toluenesulfonylhydrazide), PTSS (p-toluenesulfonyl semicarbazide), 5-PT (5-phenyltetrazole), and BSH (benzenesulfonylhydrazide), but the invention is not limited thereto. The inorganic foaming agent may be one or more selected from sodium bicarbonate ($NaHCO_3$), ammonium bicarbonate ($NH_4HCO_3$), ammonium carbonate (($NH_4)_2CO_3$), ammonium nitrite ($NH_4NO_2$), sodium borohydride ($NaBH_4$), and an azide-based compound (e.g., $Ca(N_3)_2$), but the invention is not limited thereto.

The first polymer layer PS-10 may absorb external impact occurring during transportation of the display device components. Therefore, damage to the display device components occurring during transportation thereof may be reduced or effectively prevented. The first polymer layer PS-10 may have a thickness ranging from about 800 micrometers (μm) to about 1200 μm. When the first polymer layer PS-10 has a thickness of less than 800 μm, the first polymer layer PS-10 may not sufficiently absorb external impact. When the thickness of the first polymer layer PS-10 satisfies the range mentioned above, the first polymer layer PS-10 may have satisfactory impact absorption characteristics.

The second polymer layer PS-20 may be disposed on each of top and bottom surfaces of the first polymer layer PS-10 (e.g., second polymer layers PS-20), and thus may protect and support the first polymer layer PS-10. The second polymer layer PS-20 may be disposed directly on each of the top and bottom surfaces of the first polymer layer PS-10. The second polymer layer PS-20 may include a second polymer resin. The second polymer layer PS-20 may have an elastic modulus greater than that of the first polymer layer PS-10. In an embodiment, for example, the second polymer layer PS-20 may include a material which is harder than that of the first polymer layer PS-10. The second polymer layer PS-20 may include high-density polyethylene ("HDPE"), but the invention is not limited thereto. In an embodiment, for example, the second polymer layer PS-20 may include one of polyaniline, polypyrrole, and PEDOT (poly(3,4-ethylenedioxythiophene)).

The second polymer layer PS-20 may further include an antistatic agent therein. The second polymer layer PS-20 may include conductive carbon, conductive polymer, nano-metal, or surfactant as the antistatic agent, but the antistatic agent is not particularly limited in material. The conductive carbon may be, for example, carbon black. The conductive polymer may be, for example, polyaniline, polypyrrole, or polythiophene. The nano-metal may be, for example, ITO (indium tin oxide), ATO (antimony-doped tin oxide), or silver (Ag). The surfactant may be, for example, an amine-based surfactant, a glycerin-based surfactant, ammonium salt, sulfonate, phosphate, phosphoric acid, or a betaine-based compound. When the second polymer layer PS-20 includes the antistatic agent, it may be possible to discharge static electricity occurring at the display device components.

Accordingly, when a certain one of the display device components is unloaded from the tray module TM so as to be assembled with other members or other display device components, attachment of one or more embodiment of the protective sheet PS or the protective sheet PS-a to the certain display device component may be reduced or effectively prevented. In addition, damage to the display device components by static electricity, such as damage to circuits included in the display device components and sensitive to the static electricity, may be reduced or effectively prevented.

The second polymer layer PS-20 may have a thickness ranging from about 25 μm to about 35 μm. When the thickness of the second polymer layer PS-20 satisfies the range mentioned above, the second polymer layer PS-20 may achieve satisfactory impact absorption and antistatic characteristics. The second polymer layer PS-20 may be provided in a film shape. The invention, however, is not limited thereto.

The paper layer PS-30 may be disposed on at least one of the second polymer layers PS-20. In an embodiment, for example, referring to FIG. 6A, the paper layer PS-30 may be disposed on one among the second polymer layers PS-20 respectively provided on the top and bottom surfaces of the first polymer layer PS-10. Referring to FIG. 6B, the paper layer PS-30 may be disposed on each of two second polymer layers PS-20 (e.g., paper layers PS-30). The paper layer PS-30 may be provided on an outer surface of the a respective one of the second polymer layers PS-20.

As shown in FIG. 6A, the protective sheet PS may have a structure in which the paper layer PS-30, the second polymer layer PS-20, the first polymer layer PS-10, and the second polymer layer PS-20 are sequentially stacked. The paper layer PS-30 and the second polymer layer PS-20 respectively define an external top surface and an external bottom surface of the protective sheet PS. As shown in FIG. 6B, the protective sheet PS-a may have a structure in which the paper layer PS-30, the second polymer layer PS-20, the first polymer layer PS-10, the second polymer layer PS-20, and the paper layer PS-30 are sequentially stacked. The paper layers PS-30 respectively define an external top surface and an external bottom surface of the protective sheet PS-a.

An adhesive layer ADH may be provided in plural (e.g., adhesive layers ADH) may attach the paper layer PS-30 to the second polymer layer PS-20. The paper layer PS-30 may include a cellulose pulp. The cellulose pulp included in the paper layer PS-30 may include one or more of a chemical pulp such as Kraft pulp ("KP"), sulphite pulp ("SP"), and soda pulp ("AP"); a semichemical pulp such as semichemical pulp ("SCP") and chemigroundwood pulp ("CGP"); a mechanical pulp such as groundwood pulp ("GP"), thermo-mechanical pulp ("TMP"), bleached chemithermo-mechanical pulp ("BCTMP"), and refiner groundwood pulp ("RGP"); and a non-wood fiber pulp whose raw material is obtained from a paper mulberry, a paper bush, a hemp, or a kenaf, but the cellulose pulp is not particularly limited in material.

When the protective sheets PS and PS-a do not include the paper layer PS-30, the second polymer layer PS-20 may directly contact one or more of the display device components. In this case, a polymeric constituent of the second polymer layer PS-20 may be transferred to the display device components. In particular, when the second polymer layer PS-20 is in contact with glass constituents of the display device components, the polymeric constituent may be easily transferred to the glass constituents. Accordingly, an additional cleaning process may be required after the display device components are unloaded from the tray module TM.

Since the tray module TM according to one or more embodiment includes the paper layer PS-30 disposed on the second polymer layer PS-20 to be between the second polymer layer PS-20 and a display device component, transfer of the polymeric constituent included in the second polymer layer PS-20 to the display device components may be reduced or effectively prevented. Therefore, an additional cleaning process may not be required, and thus a manufacturing process may be simplified, to reduce manufacturing time and manufacturing cost.

The paper layer PS-30 may further include an antistatic agent. In an embodiment, for example, the paper layer PS-30 may be provided or formed by adding an antistatic agent to a pulp raw material. Alternatively, the paper layer PS-30 may further include an antistatic agent which has been coated on a base material such as a layer of the pulp raw material. In an embodiment, for example, the antistatic agent may include, but not limited to, one or more of the antistatic agents of the second polymer layer PS-20 discussed above.

When the paper layer PS-30 includes an antistatic agent, static electricity occurring at the display device components may be discharged. Thus, damage to the display device components by static electricity, such as damage to circuits included in the display device components which are sensitive to the static electricity may be reduced or effectively prevented.

The paper layer PS-30 may have a thickness ranging from about 50 μm to 100 μm. When the paper layer PS-30 has a thickness of less than 50 μm, the paper layer PS-30 may be easily damaged, for example, torn during transportation of the display device components by the tray module TM. When the thickness of the paper layer PS-30 satisfies the range mentioned above, the paper layer PS-30 may achieve satisfactory impact absorptivity.

Figure 7A:
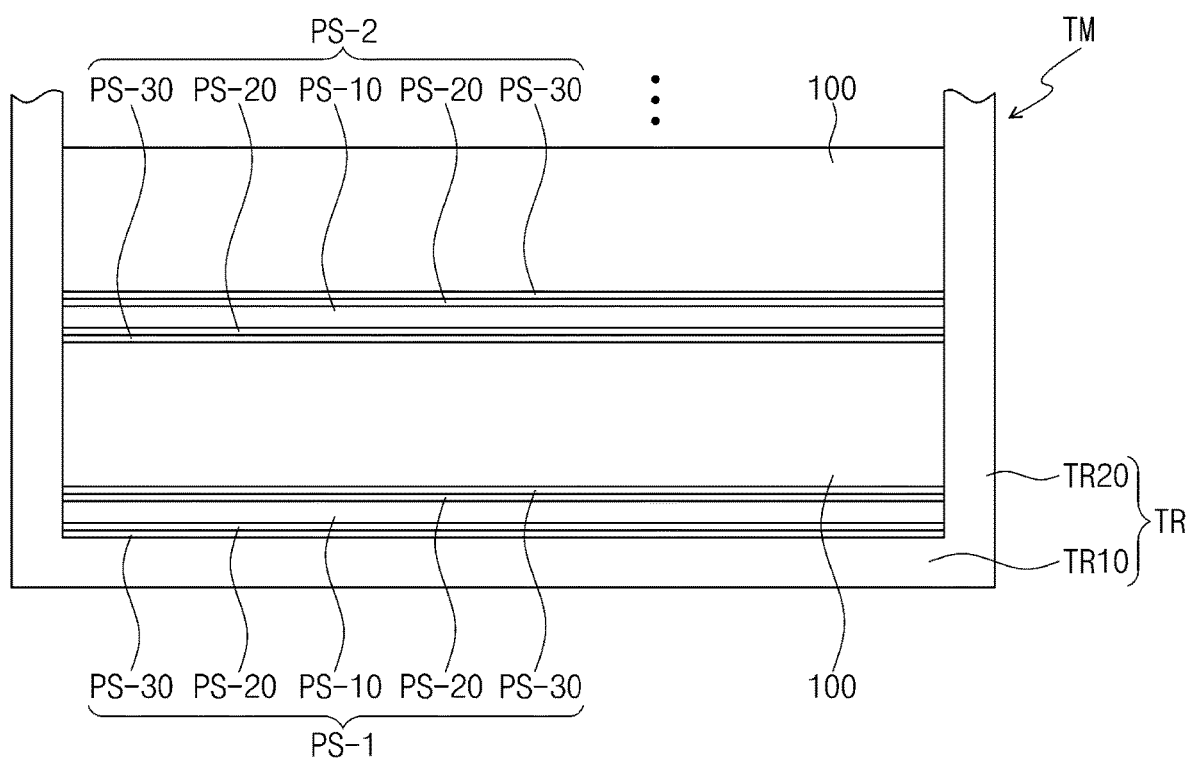
FIGS. 7A and 7B illustrate enlarged cross-sectional views of embodiments of a tray module relative to a display device component.
Figure 7B:
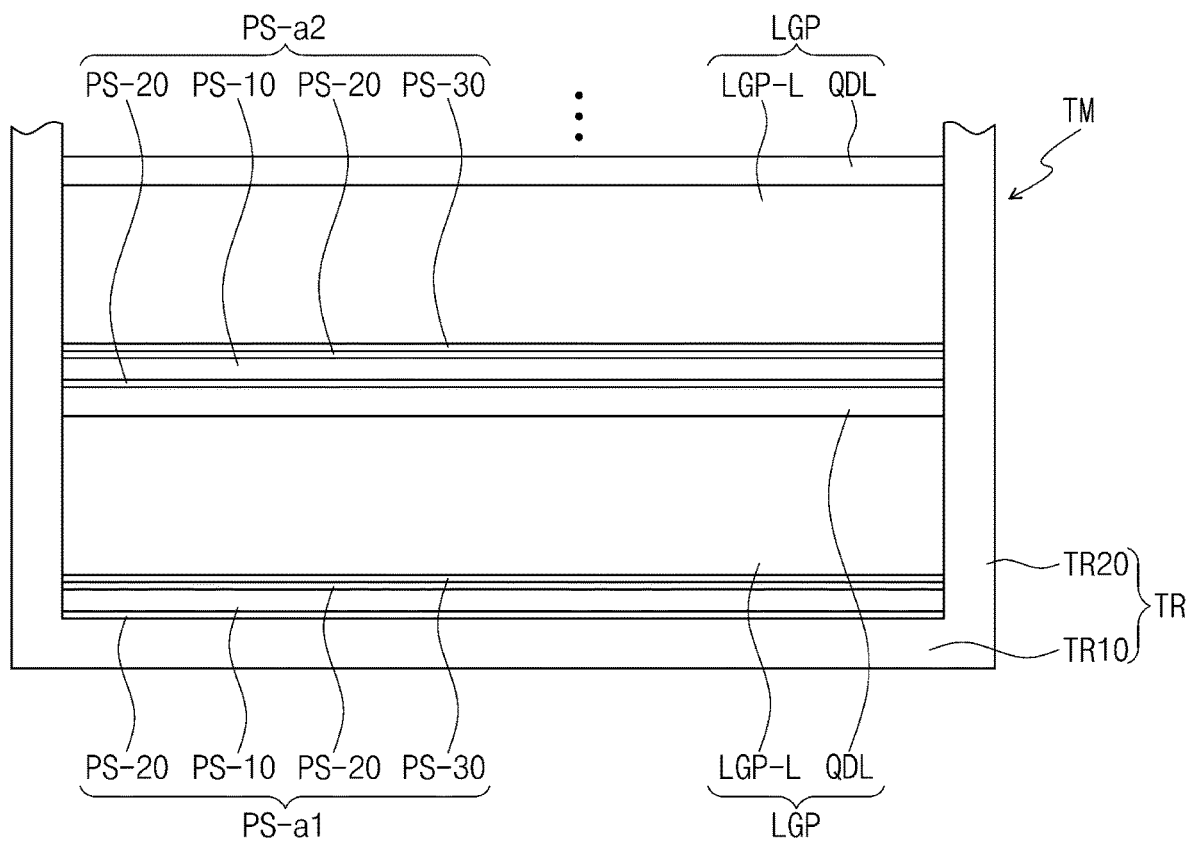

FIGS. 7A and 7B illustrate enlarged cross-sectional views of a tray module TM relative to a display device component. In FIG. 7A, the protective sheet PS discussed above may be hereinafter referred to a first protective sheet PS-1 or a second protective sheet PS-2, depending on a position within a stacked structure, but the first protective sheet PS-1 and the second protective sheet PS-2 may have the same configuration as one or more of the embodiments of the protective sheet PS and the protective sheet PS-a described herein. In FIG. 7B, the protective sheet PS-a discussed above may be hereinafter referred to as a first protective sheet PS-a1 or a second protective sheet PS-a2, depending on a position within a stacked structure, but the first protective sheet PS-a1 and the second protective sheet PS-a2 may have the same configuration as one or more of the embodiments of the protective sheet PS and the protective sheet PS-a described herein.

FIG. 7A illustrates an enlarged cross-section where the first protective sheet PS-1, one of the display device components, and the second protective sheet PS-2 are stacked in an alternate manner along a thickness direction. FIG. 7A shows the display panel 100 as one example of the display device components. FIG. 7B shows the light guide plate LGP as an example of the display device components. The light guide plate LGP is illustrated to include the light guide layer LGP-L and the quantum-dot layer QDL.

Referring to FIG. 7A, each of the first and second protective sheets PS-1 and PS-2 may include the first polymer layer PS-10, the second polymer layers PS-20 respectively disposed on the top and bottom surfaces of the first polymer layer PS-10, and the paper layers PS-30 respectively disposed on the second polymer layers PS-20. As discussed above, the display panel 100 may include a glass constituent. Since top and bottom surfaces (e.g., outer surfaces) of the display panel 100 which are exposed to the first and second protective sheets PS-1 and PS-2 may be in contact with the paper layers PS-30 of the first and second protective sheets PS-1 and PS-2, respectively, a polymeric constituent of the second polymer layer PS-20 may not be transferred to the display panel 100. That is, the paper layer PS-30 is disposed within the first and second protective sheets PS-1 and PS-2 at or corresponding to each interface of a display device component including a glass constituent, with a sheet among the first and second protective sheets PS-1 and PS-2.

Referring to FIG. 7B, each of the first and second protective sheets PS-a1 and PS-a2 may include the first polymer layer PS-10, the second polymer layers PS-20 respectively disposed on the top and bottom surfaces of the first polymer layer PS-10, and the paper layer PS-30 disposed on one of the second polymer layers PS-20. The light guide layer LGP-L may include a glass constituent. The light guide layer LGP-L of the light guide plate LGP may be disposed on the paper layer PS-30 of the first protective sheet PS-a1, and the quantum-dot layer QDL of the light guide plate LGP may be disposed on the second polymer layer PS-20 of the second protective sheet PS-a2. That is, the plurality of display device components (e.g., light guide plate LGP in plural) alternately stacked with a plurality of protective sheets PS-a1 and PS-a2 within the tray TR disposes the first protective sheet PS-a1 and the second protective sheet PS-a2 on opposing surfaces of the light guide plate LGP, the glass light guide layer LGP-L in contact with the paper layer PS-30 of the first protective sheet PS-a1, and the quantum-dot layer QDL in contact with the second polymer layer PS-20 of the second protective sheet PS-a2.

Since a bottom surface (e.g., outer surface) of the light guide plate LGP (e.g., defined by a bottom surface of the light guide layer LGP-L) which is exposed to the first protective sheet PS-a1 may be in contact with the paper layers PS-30 of the first protective sheet PS-a1, a polymeric constituent of the second polymer layer PS-20 may not be transferred to the light guide plate LGP. In contrast, since the quantum-dot layer QDL does not include a glass constituent, a top surface (e.g., outer surface) of the light guide plate LGP (e.g., defined by a top surface of the quantum-dot layer QDL) which is exposed to the second protective sheet PS-a2 may be in contact with the second polymer layer PS-20 of the second protective sheet PS-a2. That is, the paper layer PS-30 is disposed within the first and second protective sheets PS-a1 and PS-a2 at or corresponding to each interface of a display device component including a glass constituent, with a sheet among the first and second protective sheets PS-a1 and PS-a2. The paper layer PS-30 may be omitted at an interface of a non-glass constituent (e.g., quantum-dot layer QDL) with a sheet among the first and second protective sheets PS-a1 and PS-a2.

In case that a protective sheet PS-a includes no paper layer PS-30, a polymeric constituent may be transferred to the glass light guide layer LGP-L when the light guide plate LGP is stacked. In this case, when a pattern is formed on the glass light guide layer LGP-L by the transfer of a polymeric constituent from a protective sheet PS-a and such pattern is not removed such as by a cleaning process, the pattern may be irregularly formed and a stain may appear when the light guide plate LGP guides light.

In contrast, the tray module TM includes the light guide layer LGP-L disposed adjacent to one or more embodiment of the paper layer PS-30 of the protective sheet PS-a. Thus, even when the light guide layer LGP-L includes or is formed of glass, a polymeric constituent of the protective sheet PS-a may not be transferred to the light guide layer LGP-L. Accordingly, omitting an additional cleaning process after the light guide plate LGP is unloaded from the tray module TM may be possible. Consequently, a manufacturing process may be simplified to provide the display device DD at a relatively low cost. The quantum-dot layer QDL may form an interface with the second protective sheet PS-a2 and be in contact with the second polymer layer PS-20 of the second protective sheet PS-a2. Although the quantum-dot layer QDL is in contact with the second polymer layer PS-20, an additional cleaning process may not be needed since a polymeric constituent is not transferred to the quantum-dot layer QDL as not including a glass constituent.

FIG. 7A exemplarily illustrates that two display device components and two protective sheets PS-1 and PS-2 are stacked within the tray module TM, but an additional protective sheet PS and other display device components may be further stacked within the tray module TM. Similarly, FIG. 7B exemplarily illustrates that two display device components and two protective sheets PS-a1 and PS-a2 are stacked within the tray module TM, but an additional protective sheet PS-a and other display device components may be further stacked within the tray module TM.

Figure 8:
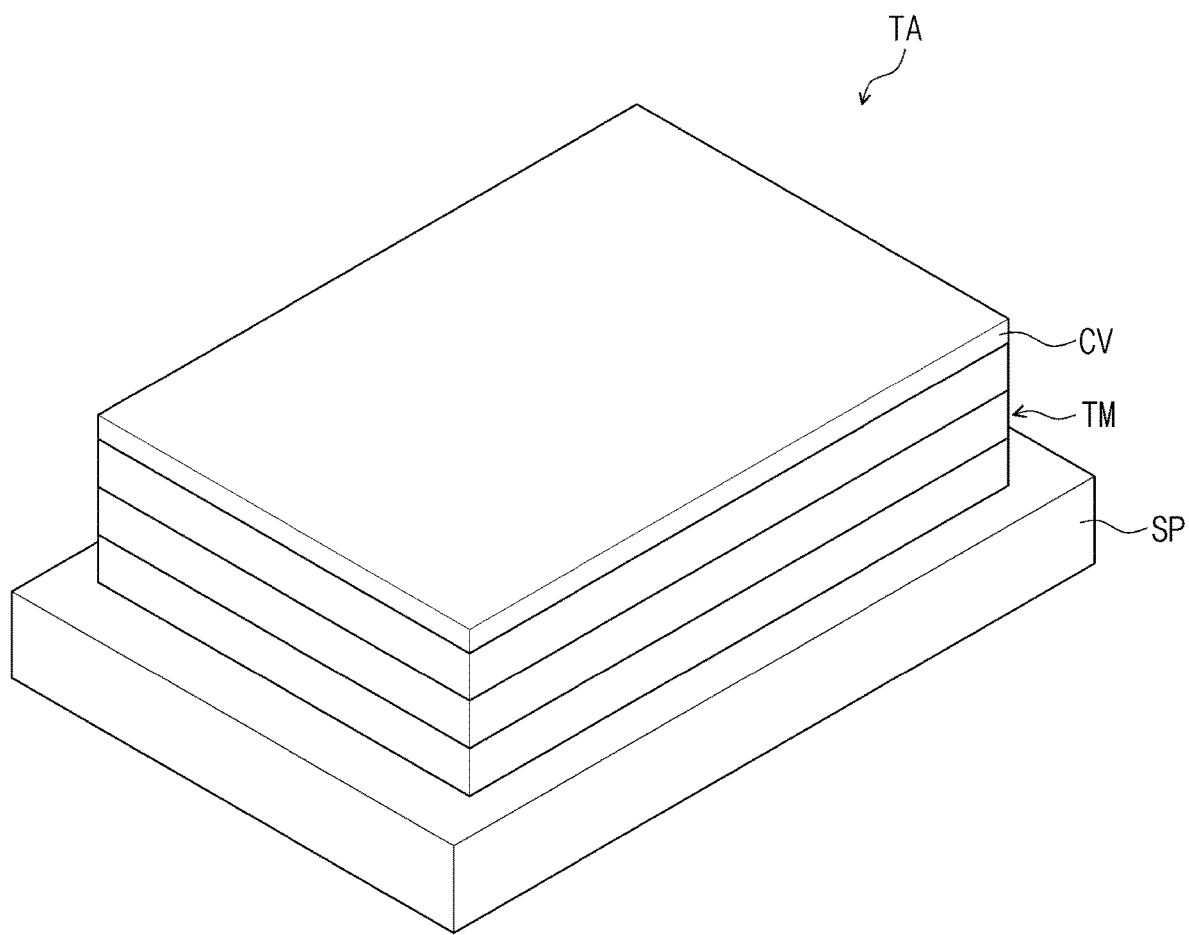
FIG. 8 illustrates a perspective view of an embodiment of a tray assembly.

FIG. 8 illustrates a perspective view of an embodiment of a tray assembly TA. The following will omit detailed descriptions of the tray module TM discussed with reference to FIGS. 1 to 6B.

The tray assembly TA may include a tray module TM provided in plural (e.g., tray modules TM) which are stacked on each other and a support plate SP which supports the plurality of tray modules TM within the tray assembly TA. FIG. 8 exemplarily illustrates three tray modules TM. The tray modules TM may be stacked with sidewall segments (see TR20 of FIG. 5A) aligned with each other. The tray assembly TA may further include a cover CV coupled to the tray module TM disposed at a top side of the stack of tray modules TM. The support plate SP may include wood or a synthetic resin. A single one of the cover CV and the support plate SP may be common to a plurality of tray modules TM. In an embodiment, the tray modules TM may be movable together with the support plate SP and the cover CV, to transfer the tray modules TM (e.g., the plurality of display device components) between different physical locations.

Figure 9A:
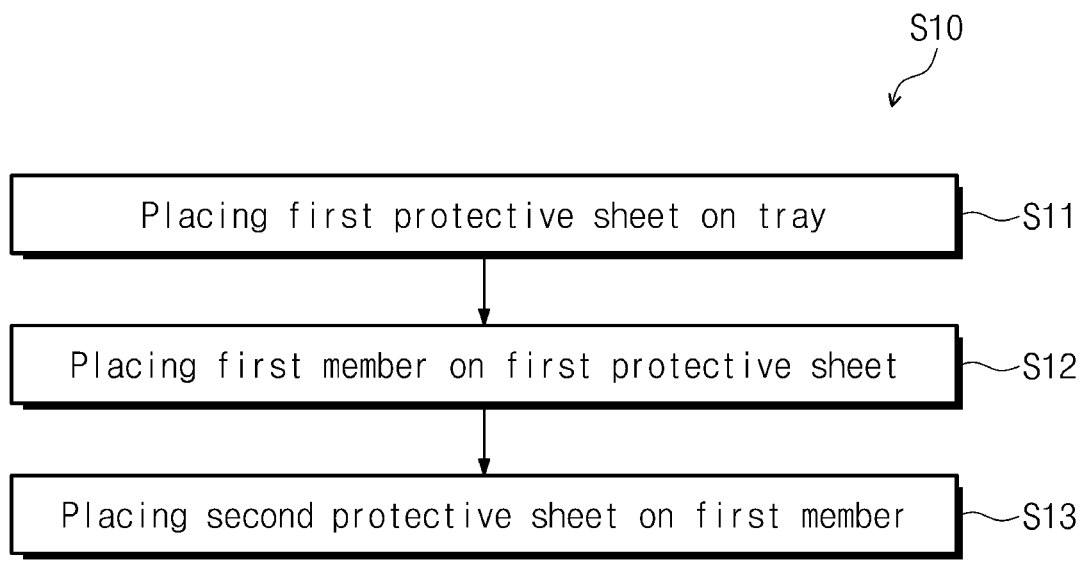
FIGS. 9A and 9B illustrate flow charts of embodiments of a method of fabricating a display device.
Figure 9B:
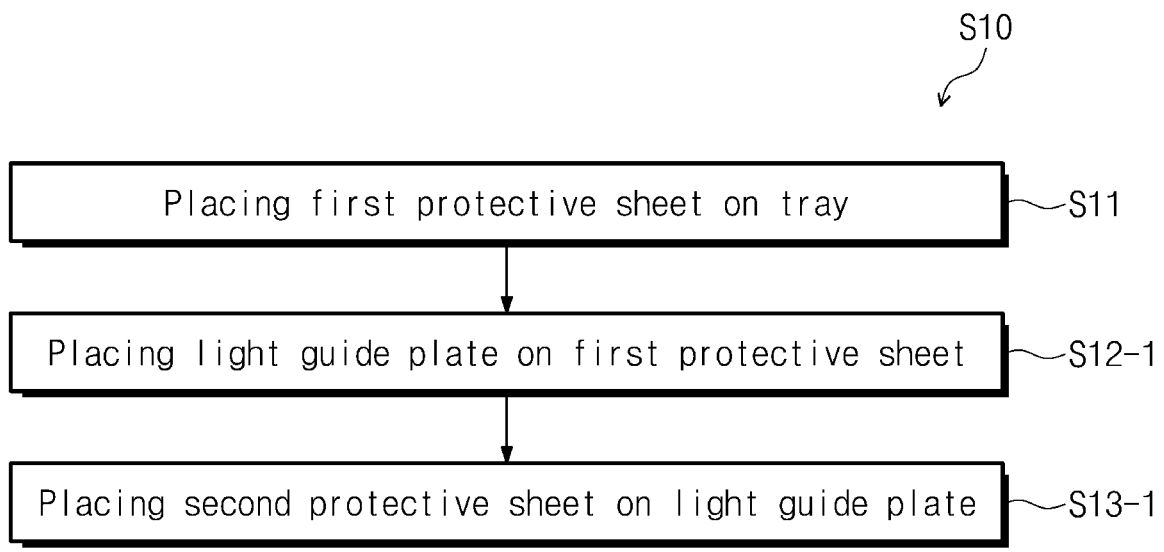

FIGS. 9A and 9B illustrate flow charts showing embodiments of processes within the method S1 of fabricating the display device DD. As discussed in FIG. 4, the method S1 of fabricating the display device DD may include processes of providing the display device components (S10) and assembling the display device components (S20). The proving the display device components (S10) may include using a tray assembly TA to transfer first members among the display device components between different physical spaces or physical locations.

Referring to FIG. 9A, with reference to FIGS. 7A and 8, using a tray assembly TA to transfer first members among the display device components may include for each of a plurality of tray modules TM, providing the first protective sheet PS-1 on the tray TR of a tray module TM among the plurality of tray modules TM (S11), providing a first member on the first protective sheet PS-1 (S12), and providing the second protective sheet PS-2 on the first member (S13). The proving the display device components (S10) may further include stacking the plurality of tray modules TM on the support plate SP of the tray assembly TA (FIG. 8) and providing the cover CV of the tray assembly TA (FIG. 8) on the uppermost tray module TM among the tray modules TM stacked in the support plate SP. With the plurality of tray modules TM provided between the support plate SP and the cover CV, the display device component may be easily moved and damage thereto may be minimized.

Referring to FIG. 9B, with reference to FIGS. 7B and 8, using a tray assembly TA to transfer first members among the display device components may include for each of a plurality of tray modules TM, providing the first protective sheet PS-a1 on the tray TR of a tray module TM among the plurality of tray modules TM (S11), providing the light guide plate LGP on the first protective sheet PS-a1 (S12-1), and providing the second protective sheet PS-a2 on the light guide plate LGP (S13-1). The proving the display device components (S10) may further include stacking the plurality of tray modules TM on the support plate SP of the tray assembly TA (FIG. 8) and providing the cover CV of the tray assembly TA (FIG. 8) on the uppermost tray module TM among the tray modules TM stacked in the support plate SP. With the plurality of tray modules TM provided between the support plate SP and the cover CV, the display device component may be easily moved and damage thereto may be minimized.

The descriptions regarding the same configurations as those discussed with reference to FIGS. 1 to 9B are also applicable to the embodiments shown in FIGS. 10A to 11C, and accordingly, repetitive detailed descriptions will be omitted below.

Figure 10A:
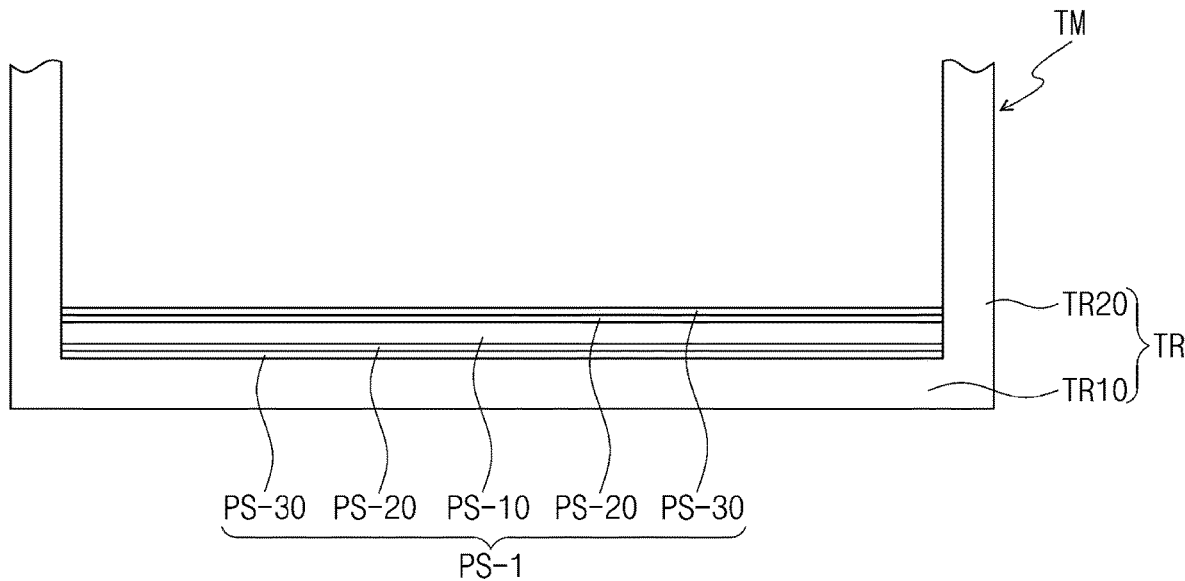
FIG. 10A illustrates a cross-sectional view of an embodiment of a process in the method of FIG. 9A.
Figure 10B:
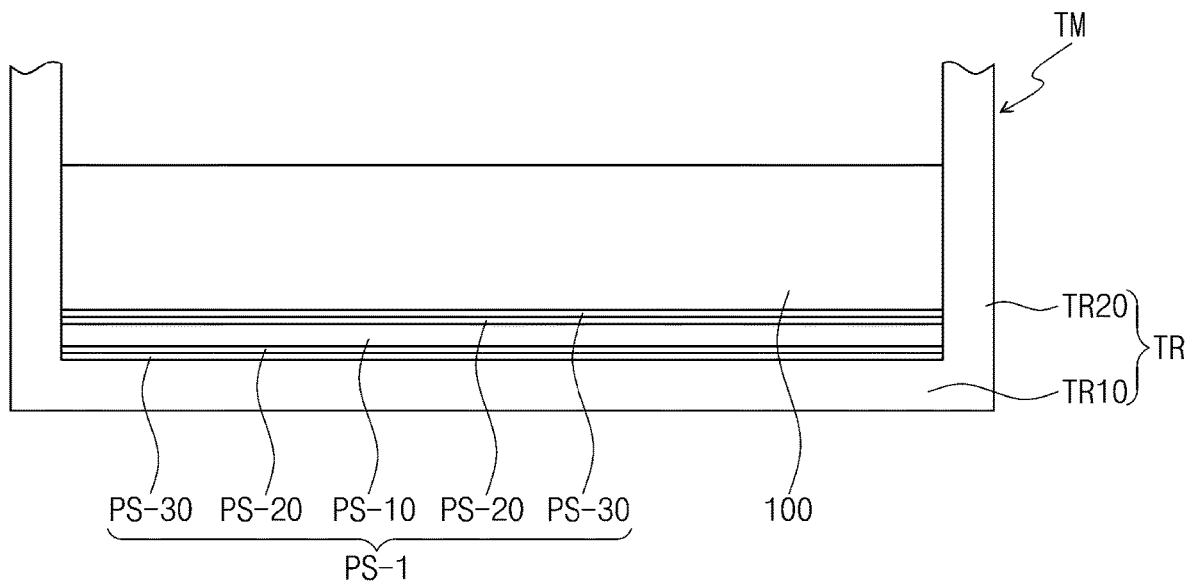
FIG. 10B illustrates a cross-sectional view of an embodiment of a process in the method of FIG. 9A.
Figure 10C:
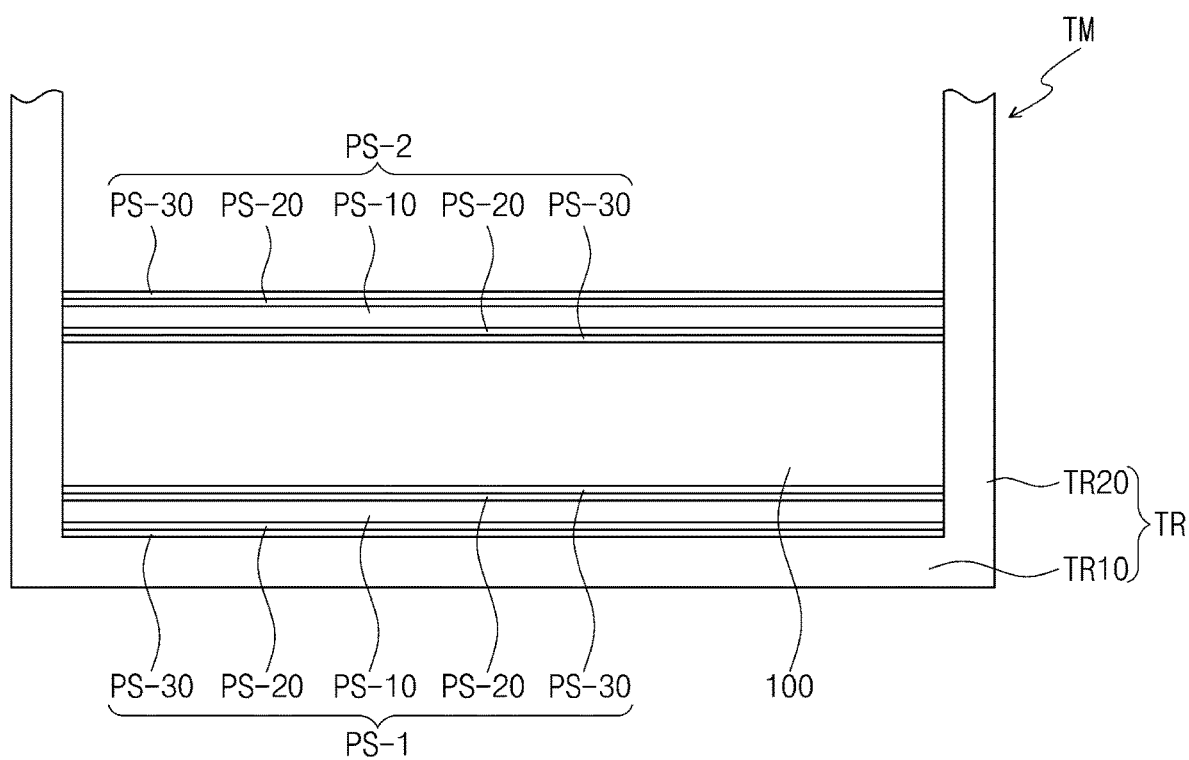
FIG. 10C illustrates a cross-sectional view of an embodiment of a process in the method of FIG. 9A.

FIG. 10A illustrates a cross-sectional view of providing the first protective sheet PS-1 on the tray TR of a tray module TM (S11) in FIG. 9A, showing that the first protective sheet PS-1 is placed in the tray TR. FIG. 10B illustrates a cross-sectional view of providing a first member on the first protective sheet PS-1 (S12) in FIG. 9A, showing that a first member is placed on and in a same tray TR as the first protective sheet PS-1. FIG. 10C illustrates a cross-sectional view of providing the second protective sheet PS-2 on the first member (S13) in FIG. 9A, showing that the second protective sheet PS-2 is placed on and in a same tray TR as the first member.

Referring to FIGS. 10A to 10C, together with FIG. 7A, the first protective sheet PS-1 may be placed on the tray TR, the display panel 100 may be placed on the first protective sheet PS-1, and the second protective sheet PS-2 may be placed on the display panel 100. Since each of the first and second protective sheets PS-1 and PS-2 includes the paper layers PS-30 on the second polymer layers PS-20, transfer of a polymeric constituent to the display panel 100 during transportation thereof is reduced or effectively prevented.

Figure 11A:
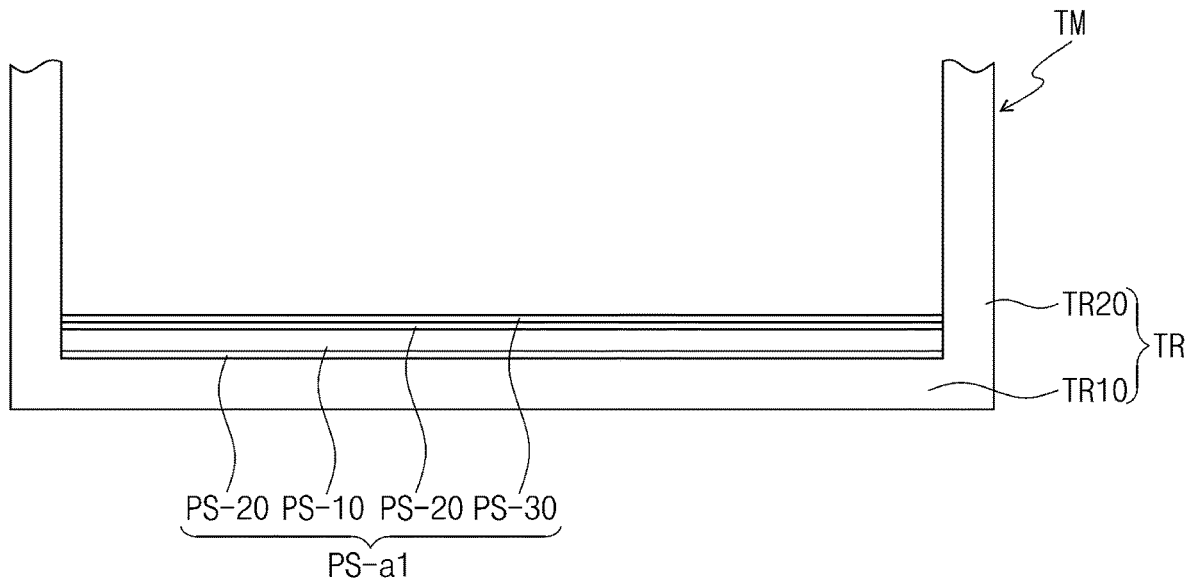
FIG. 11A illustrates a cross-sectional view of an embodiment of a process in the method of FIG. 9B.
Figure 11B:
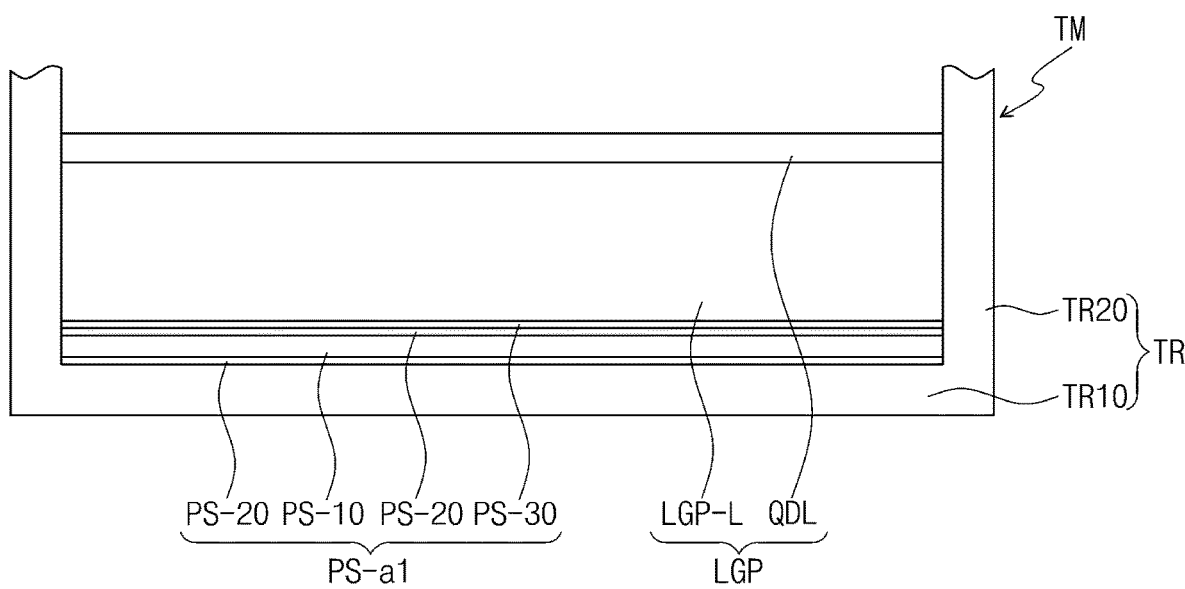
FIG. 11B illustrates a cross-sectional view of an embodiment of a process in the method of FIG. 9B.
Figure 11C:
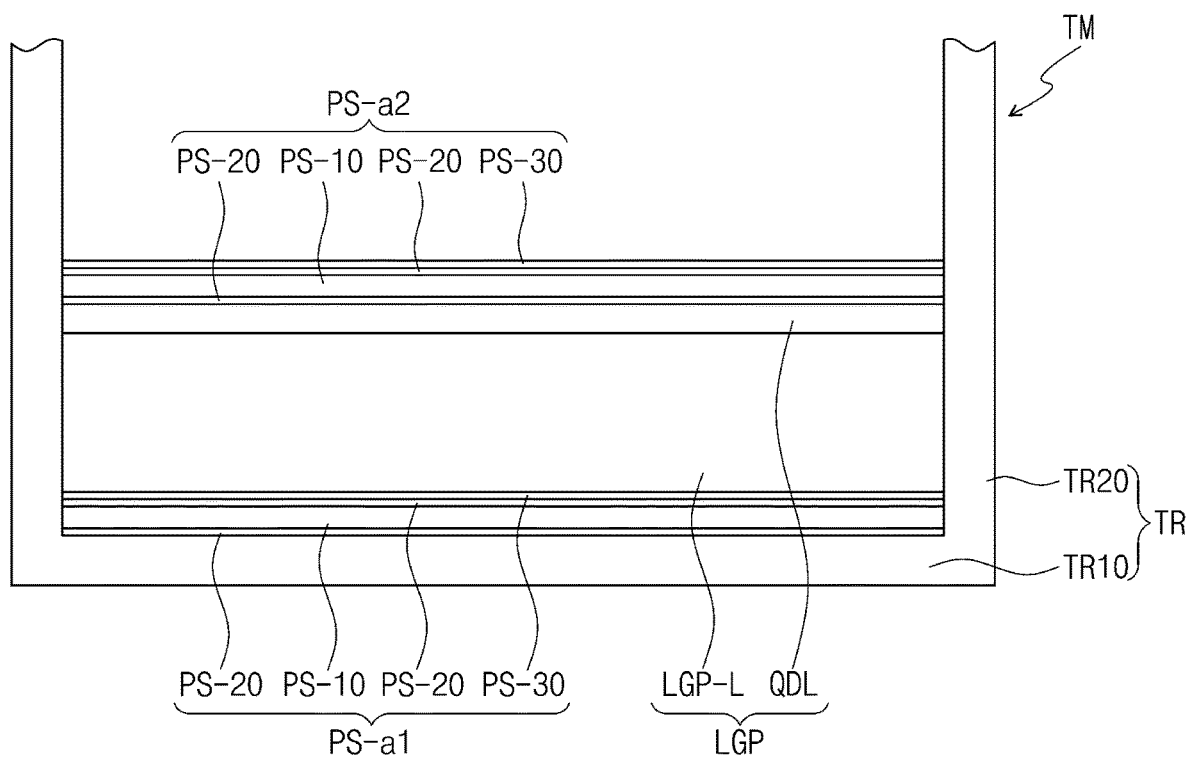
FIG. 11C illustrates a cross-sectional view of an embodiment of a process in the method of FIG. 9B.

FIG. 11A illustrates a cross-sectional view of providing the first protective sheet PS-a1 on the tray TR of a tray module TM (S11) of FIG. 9B, showing that the first protective sheet PS-a1 is placed in the tray TR. FIG. 11B illustrates a cross-sectional view of providing the light guide plate LGP on the first protective sheet PS-a1 (S12-1) in FIG. 9B, showing that the light guide plate LGP is placed on and in the same tray TR as the first protective sheet PS-a1. FIG. 11C illustrates a cross-sectional view of providing the second protective sheet PS-a2 on the light guide plate LGP (S13-1) of FIG. 9B, showing that the second protective sheet PS-a2 is placed on and in a same tray TR as the light guide plate LGP.

Referring to FIG. 11A, the first protective sheet PS-a1 may be placed on the tray TR. The first protective sheet PS-a1 may be placed on the tray TR so as to allow the second polymer layer PS-20 to contact the tray TR at an interface therebetween. Referring to FIG. 11B, the light guide plate LGP may be placed on the first protective sheet PS-a1. The light guide layer LGP-L of the light guide plate LGP may be disposed to contact the paper layer PS-30 of the first protective sheet PS-a1. Referring to FIG. 11C, the second protective sheet PS-a2 may be placed on the light guide plate LGP. The second polymer layer PS-20 of the second protective sheet PS-a2 may be disposed to contact the quantum-dot layer QDL of the light guide plate LGP. In an embodiment, for example, in an embodiment, the light guide layer LGP-L of the light guide plate LGP may be disposed to contact the paper layer PS-30 of the protective sheet PS-a, and the quantum-dot layer QDL of the light guide plate LGP may be disposed to contact the second polymer layer PS-20 of the protective sheet PS-a. In this case, although the light guide layer LGP-L includes a glass, a polymeric constituent of the second polymer layer PS-20 may not be transferred to the light guide layer LGP-L. Therefore, according to the display device fabrication method S1, a separate cleaning process may be omitted, and manufacturing time and cost may be reduced.

In an embodiment, the protective sheet PS may include the paper layer PS-30 disposed at one or more of the second polymer layers PS-20. Therefore, since a separate cleaning process is omitted in fabricating the display device DD, manufacturing cost and time may be reduced.

When display device components are transferred between physical spaces or physical locations by using a tray module TM and a tray assembly TA according to one or more embodiment described above, stains occurring on the display device components may be reduced or effectively prevented.

Although the invention is described in conjunction with embodiments thereof, those skilled in the art understand that the invention can be modified or changed in various ways without departing from spirit and scope of the invention defined by the appended claims. Further, the embodiments disclosed herein are not intended to limit the technical spirit of the invention, and all technical spirit within the claims and their equivalents should be construed as being included in the invention.

What is claimed is:

1. A tray module, comprising:
   a tray in which a plurality of display device components are alternately stackable with a plurality of protective sheets, each of the plurality of display device components having an exposed glass layer,
   wherein
   each of a protective sheet among the plurality of protective sheets includes:
      a first polymer layer including a first polymer resin which is foamed, and top and bottom surfaces opposite to each other;
      a second polymer layer on each of the top and bottom surfaces of the first polymer layer, the second polymer layer including a second polymer resin; and
      a paper layer disposed on at least one of the second polymer layer on each of the top and bottom surfaces of the first polymer layer, and
   the plurality of display device components alternately stacked with the plurality of protective sheets within the tray disposes each of the exposed glass layers forming an interface with the paper layer of a respective protective sheet among the plurality of protective sheets.

2. The tray module of claim 1, wherein within the protective sheet, the paper layer includes a cellulose pulp.

3. The tray module of claim 1, wherein within the protective sheet, the paper layer includes an antistatic agent.

4. The tray module of claim 1, wherein a thickness of the paper layer within the protective sheet is from about 50 micrometers to about 100 micrometers.

5. The tray module of claim 1, wherein the plurality of display device components includes a light guide plate or a display panel.

6. The tray module of claim 1, wherein
   the plurality of display device components each includes a light guide plate including a glass light guide layer as the exposed glass layer and a quantum-dot layer which is on the glass light guide layer,
   the plurality of protective sheets includes a first protective sheet and a second protective sheet, and
   the plurality of display device components alternately stacked with the plurality of protective sheets within the tray disposes:
      the first protective sheet and the second protective sheet on opposing surfaces of the light guide plate,
      the glass light guide layer forming an interface with the paper layer of the first protective sheet, and
      the quantum-dot layer forming an interface with the second polymer layer of the second protective sheet.

7. The tray module of claim 1, wherein the protective sheet further includes an adhesive layer disposed directly between the second polymer layer and the paper layer.

8. The tray module of claim 1, wherein the tray includes:
   a bottom portion on which the plurality of display device components and the plurality of protective sheets are supportable; and
   a sidewall portion extending from the bottom portion.

9. The tray module of claim 1, wherein the first polymer layer within the protective sheet further includes a foaming agent.

10. The tray module of claim 1, wherein the second polymer layer within the protective sheet further includes an antistatic agent.

11. The tray module of claim 1, wherein within the protective sheet, the second polymer layer is directly on the first polymer layer.

12. The tray module of claim 1, wherein within the protective sheet,
   the first polymer resin is low-density polyethylene, and
   the second polymer resin is high-density polyethylene.

13. The tray module of claim 1, wherein within the protective sheet,
   a thickness of the first polymer layer is from about 800 micrometers to about 1200 micrometers, and
   a thickness of the second polymer layer is from about 25 micrometers ($\mu$m) to about 35 micrometers.

14. A tray assembly, comprising:
   a plurality of tray modules which are stackable on each other; and
   a support plate on which the plurality of tray modules are supportable,
   wherein
   each of the tray modules includes a tray in which a plurality of display device components are alternately stackable with a plurality of protective sheets, each of the plurality of display device components having an exposed glass layer,
   each of a protective sheet among the plurality of protective sheets includes:
      a first polymer layer including a first polymer resin which is foamed, and top and bottom surfaces opposite to each other,
      a second polymer layer on each of the top and bottom surfaces of the first polymer layer, the second polymer layer including a second polymer resin; and
      a paper layer disposed on at least one of the second polymer layer on each of the top and bottom surfaces of the first polymer layer, and
   the plurality of display device components alternately stacked with the plurality of protective sheets within the tray disposes each of the exposed glass layers forming an interface with the paper layer of a respective protective sheet among the plurality of protective sheets.

15. The tray assembly of claim 14, wherein the plurality of display device components each includes a light guide plate including a glass light guide layer as the exposed glass layer or a display panel including a glass substrate as the exposed glass layer.

16. The tray assembly of claim 15, wherein
the light guide plate further includes a quantum-dot layer on the glass light guide layer, and
the plurality of display device components alternately stacked with the plurality of protective sheets within the tray respectively disposes the glass light guide layer forming an interface with the paper layer of the respective protective sheet among the plurality of protective sheets.

17. The tray assembly of claim 14, wherein
the first polymer layer further includes a foaming agent, and
the second polymer layer further includes an antistatic agent.

* * * * *